United States Patent [19]

Aikawa et al.

[11] Patent Number: 5,032,934
[45] Date of Patent: Jul. 16, 1991

[54] MAGNETIC DISC APPARATUS WITH A COSINE EQUALIZER AND SPECIFIC GAP LENGTH HEAD

[75] Inventors: Shinichi Aikawa, Mitaka; Yoshiaki Sakai, Higashikurume; Hiroshi Tsuyuguchi, Tokyo; Fumio Nagase, Tama, all of Japan

[73] Assignee: Teac Corporation, Japan

[21] Appl. No.: 395,736

[22] Filed: Aug. 18, 1989

[51] Int. Cl.$^5$ .............................................. G11B 5/035
[52] U.S. Cl. ........................................ 360/65; 360/119
[58] Field of Search .................... 360/65, 46, 110, 119

[56] References Cited

U.S. PATENT DOCUMENTS

| | | |
|---|---|---|
| 4,081,756 | 3/1978 | Prince et al. ........................ 360/53 |
| 4,615,037 | 9/1986 | Adles .................................. 360/65 |
| 4,646,184 | 2/1987 | Goto et al. ......................... 360/120 |
| 4,722,010 | 1/1988 | Suzuki et al. ....................... 360/65 |
| 4,979,053 | 12/1990 | Kusunoki .......................... 360/46 |

Primary Examiner—David J. Severin
Attorney, Agent, or Firm—Andrus, Sceales, Starke & Sawall

[57] ABSTRACT

A magnetic disc apparatus comprises a single write/-read magnetic head for carrying out write/read with respect to either one of a low-density magnetic disc and a high-density magnetic disc, and a cosine equalizer supplied with a read signal from the write/read magnetic head. The write/read magnetic head has a core gap length which is between 0.60 and 1.20 times a minimum field conversion length for high-density write by a write/read signal.

7 Claims, 3 Drawing Sheets

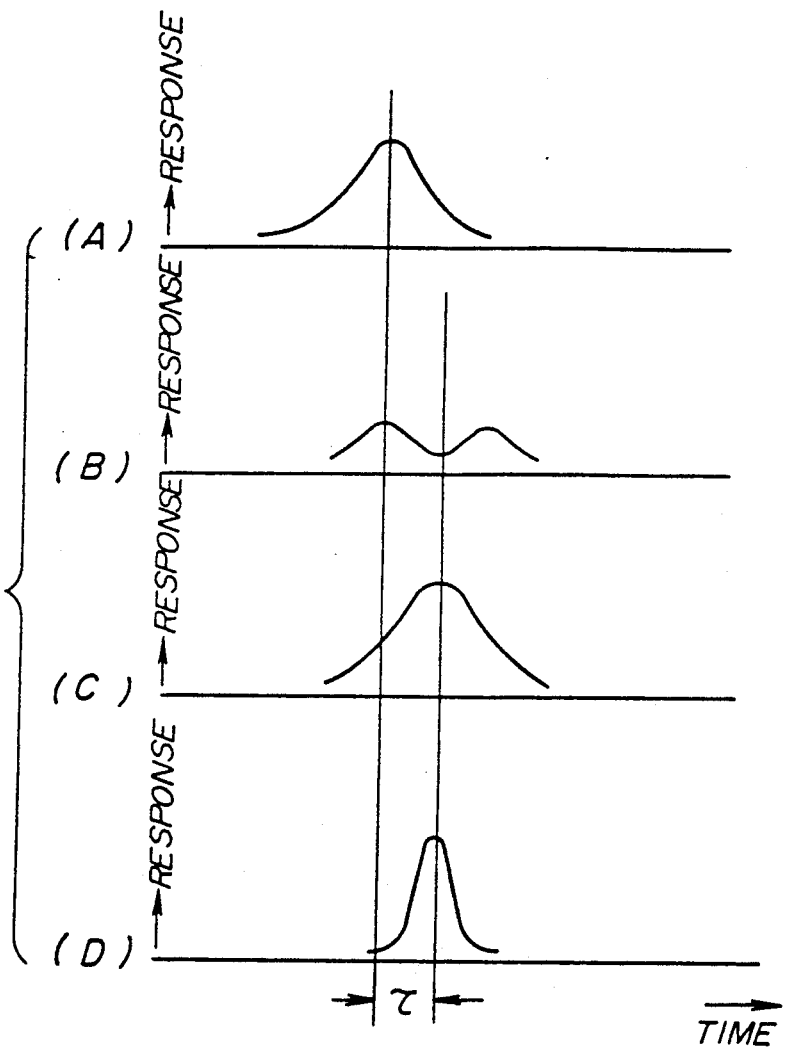
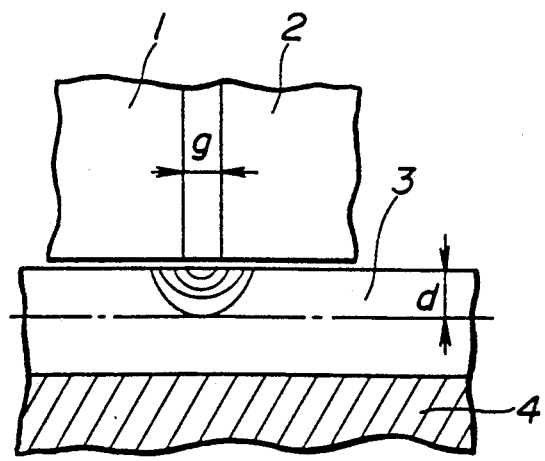

MAGNETIC DISC APPARATUS WITH A COSINE EQUALIZER AND SPECIFIC GAP LENGTH HEAD

BACKGROUND OF THE INVENTION

The present invention generally relates to magnetic disc apparatuses, and more particularly to a magnetic disc apparatus that uses both high-density and low-density magnetic discs as the storage media and that can provide favorable write and read processing for the write and read modes, respectively.

In conventional magnetic disc apparatuses that perform low-density read/write using floppy discs as the storage media, the magnetic layer is magnetized to such a deep portion that an adequate overwrite characteristic and read margin are obtainable. To achieve this, the core gap length of the write/read head is set at a maximum of 0.60 times the minimum field conversion length for the write/read signal current, and the resolution at the innermost peripheral track of the magnetic disc is set to have an absolute value of 70% or more.

In magnetic disc apparatuses that perform high-density write/read and that have been proposed to date, the core gap length for the write/read head is made smaller so that the minimum field conversion length can be made smaller. The depth of magnetization is therefore not as deep and the thickness of the magnetic layer of the magnetic disc can therefore be reduced.

Moreover, magnetic disc apparatuses having mode switching to perform both low-density write/read and high-density write/read have also been proposed to be compatible with both low-density and high-density magnetic discs. Magnetic disc apparatuses of this type have a single write/read head to perform write and read for both the low-density mode and the high-density mode.

However, there are the following problems with this type of low-density/high-density compatible magnetic disc apparatus. The example used to explain these problems is a magnetic disc apparatus which uses a magnetic disc with a diameter of 90 mm (3.5 inches) and has a high-density write/read mode in which the recording density is 2MB and a low-density write/read mode in which the recording density is 1MB.

In the 2MB mode (high-density write/read mode), there is the restriction that the core gap length of the head is 0.9 $\mu$m or less (1.46 $\mu$m$\times$0.60=0.876=0.9 $\mu$m, where 1.46 $\mu$m indicates the minimum field conversion length for the 2MB mode) so that the absolute value of the resolution at the innermost peripheral track of the magnetic disc has an absolute value of 70% or more.

The average thickness of the magnetic layer in the write portion of a magnetic disc for the 2MB write/read is 1.0 $\mu$m but the average thickness of the magnetic layer in the write portion of a magnetic disc for the 1MB write/read is 2.0 $\mu$m which is approximately twice that of the magnetic disc for the 1MB write/read. In addition, the minimum field conversion length (min. FCL) is 1.46 $\mu$m for the 2MB write and 2.91 $\mu$m for the 1MB write.

Magnetic discs exclusively for the 2MB write/read have a thin (approximately 1 $\mu$m) magnetic layer and so a head with the abovementioned gap length (0.9 $\mu$m) can magnetize the magnetic layer to a sufficient depth during the write. However, magnetic discs exclusively for the 1MB write/read have a thick (approximately 2 $\mu$m) magnetic layer and so when one of these discs is used in a low-density/high-density compatible magnetic disc apparatus having a head with the abovementioned gap length (0.9 $\mu$m), it is impossible to magnetize deep into the magnetic layer which is approximately twice as thick.

FIG. 1 is a sectional diagram illustrating this status, where 1 and 2 indicate the head cores, g indicates the core gap length, 3 indicates the magnetic layer, and 4 indicates the base part of the disc. When the narrow head gap of this 2MB write/read head is used to write signals at the minimum field conversion length, the magnetic flux distribution curves of this write/read head can only magnetize down to the depth indicated by d in FIG. 1. Therefore, sufficient overwrite is possible for old data written with a conventional type of head (having a narrow gap) as shown in FIG. 1, but there is a poor overwrite characteristic for old data written with a magnetic disc apparatus exclusively for the 1MB mode (having a write/read head with a wide gap length of about 1.3 to 1.5 $\mu$m).

With conventional low-density/high-density compatible magnetic disc apparatus, this write/read head has a narrow core gap length set to 0.6 to 0.9 $\mu$m for use in either the low-density or high-density mode. This causes no problem for write to 2MB magnetic discs, but there is an insufficient depth of magnetization with respect to the thick magnetic layer for write with respect to 1MB magnetic discs and this creates the problem of a poor overwrite characteristic.

If the core gap length of the magnetic head is widened so that a sufficient depth of magnetization is obtained with respect to the 1MB magnetic discs, the resolution for high-density (2MB) write will drop. If this resolution drops to 60% or less, then there will be much interference between the waveforms of adjacent bits so that the peak shift indicated in FIG. 2 occurs to hinder favorable write and read processing.

FIG. 2 shows the read waveform with respect to input data that is written at a high density. In FIG. 2, (A) represents the data pattern, (B) represents the write data and (C) represents the write current. For (C), the period for which the write current is applied (indicated by "X" in the figure) corresponds to the minimum field conversion length. In FIG. 2, (D) indicates an isolated read waveform with respect to each magnetic conversion when the resolution is 100%, and (E) indicates an isolated read waveform with respect to each magnetic conversion when the resolution is 60%. FIG. 2 shows that the peak shift indicated by $\Delta I$ occurs due to interference between the waveforms of adjacent bits when the resolution becomes about 60%.

Simply setting the core gap length to enable low-density write therefore means that it is impossible to avoid lowering the read margin for data written at high-density. Accomplishing these mutually incompatible objectives has therefore involved compromising the range for which suitable characteristics could be obtained.

SUMMARY OF THE INVENTION

Accordingly, it is a general object of the present invention to provide a novel and useful magnetic disc apparatus in which the problems described above are eliminated.

Another object of the present invention is to provide a magnetic disc apparatus that can achieve favorable write/read characteristics for both the low-density and high-density read and write modes.

Still another object of the present invention is to provide a magnetic disc apparatus that uses one write/read head to perform write and read with respect to both low-density and high-density magnetic discs and in which the core gap length of the write/read head is between 0.60 and 1.20 times the minimum field conversion length for the write and read signals, and having a cosine equalizer provided in a read circuit to which the read signals from the write/read head are supplied.

According to the present invention, the core gap length of the write/read head is set to a value which permits sufficient magnetization when writing to the thick magnetic layer of low-density magnetic discs to therefore prevent lowering of the read margin. Also, providing the cosine equalizer enables compensation for the peak shift caused by having the core gap length which is larger than the normal core gap length. The write and read characteristics are therefore improved for both the low-density and high-density magnetic discs.

Unlike the conventional low-density/high-density compatible magnetic disc apparatus in which the characteristics had to be compromised to satisfy the mutually contradictory problems of overwrite, lowering of the read margin and the generation of peak shift, the present invention solves all of these problems and enables favorable write/read characteristics to be obtained for both low-density and high-density magnetic discs. The effect of the present invention can be particularly anticipated with respect to compact magnetic disc apparatus using magnetic discs with a diameter of 90 mm (3.5 inches).

BRIEF DESCRIPTION OF THE DRAWINGS

FIG. 1 illustrates the magnetization of a magnetic disc produced by a write/read head of a conventional magnetic disc apparatus;

FIGS. 5A-5D show waveforms at various parts of the cosine equalizer.

DESCRIPTION OF THE PREFERRED EMBODIMENTS

An embodiment of a magnetic disc apparatus according to the present invention will be described with reference to FIGS. 3 through 5.

Figure 2:
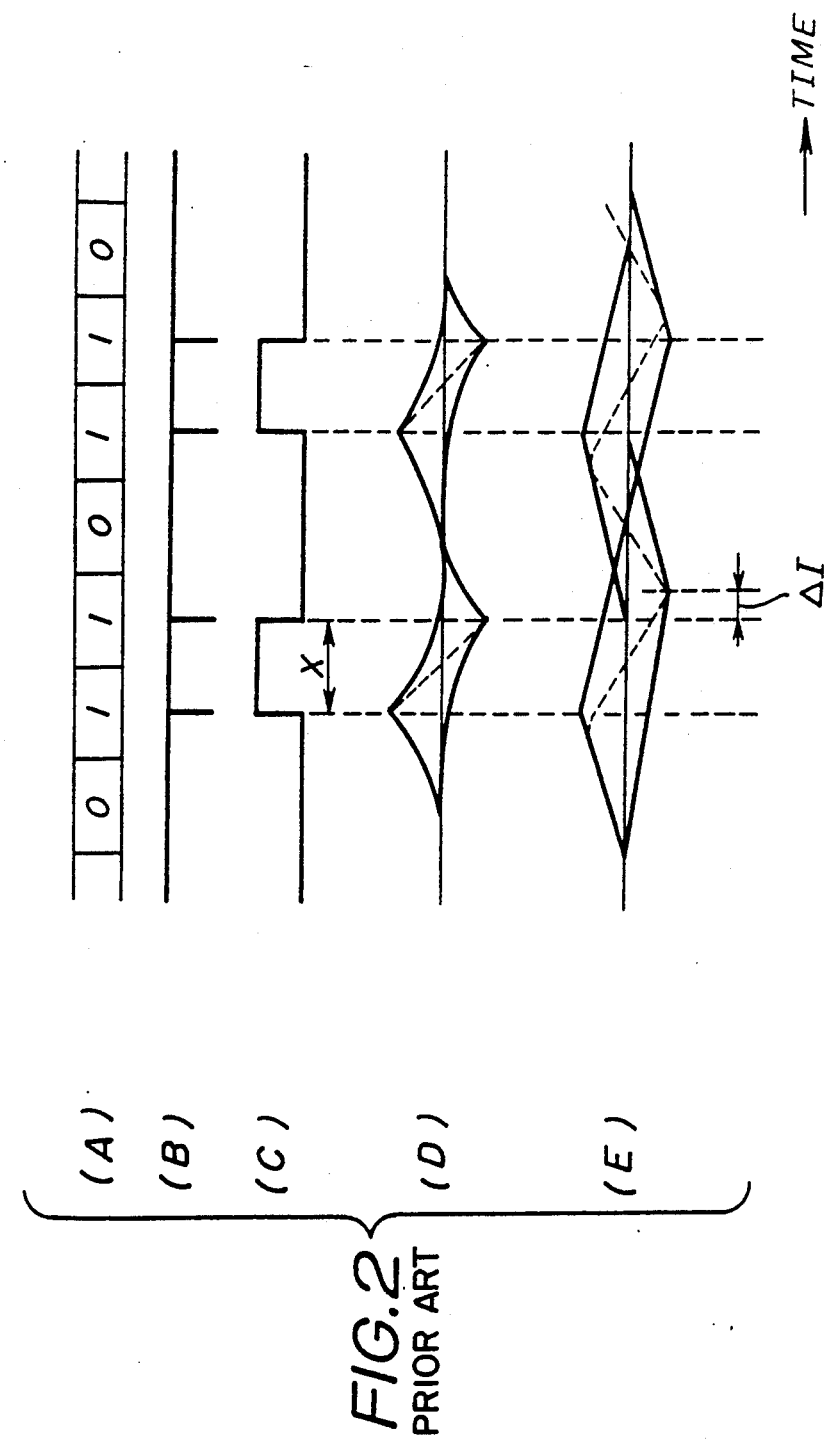
FIGS. 2A-2E show waveforms for explaining the peak shift generated in the conventional magnetic disc apparatus.
Figure 3:
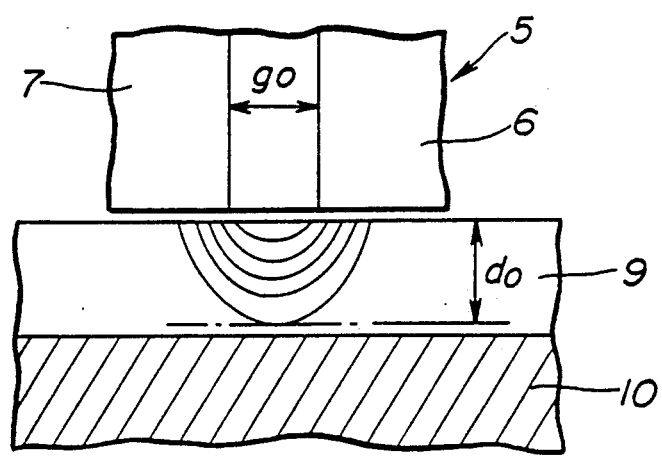
FIG. 3 illustrates the magnetization of a magnetic disc produced by a write/read head of an embodiment of a magnetic disc apparatus according to the present invention.
Figure 4:
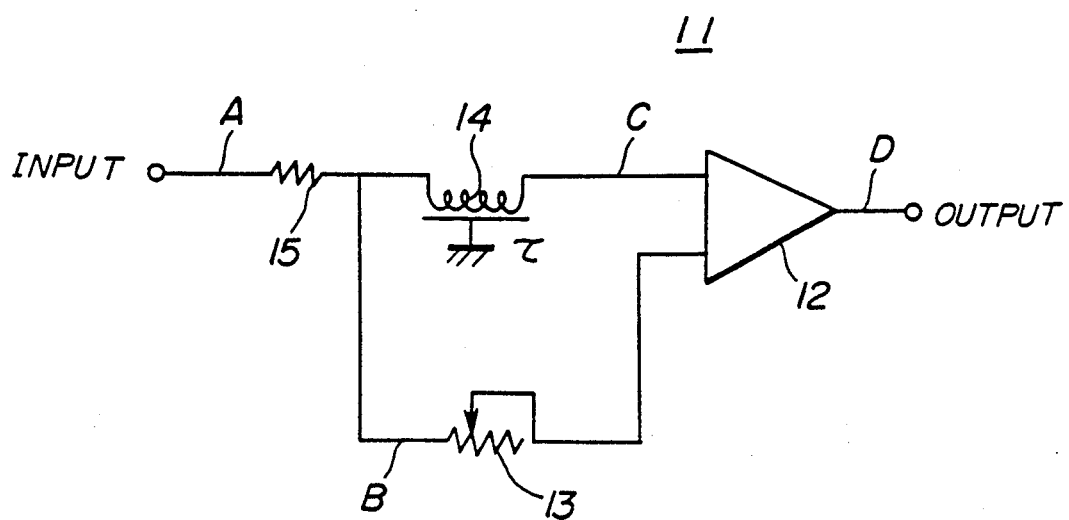
FIG. 4 is a circuit diagram showing a cosine equalizer.

In FIG. 3, a gap length $g_0$ of a write/read head 5 comprising head cores 6 and 7 is between 0.60 and 1.20 times the minimum field conversion length. This is a first feature of the present invention. The gap length g is set at a minimum of 0.60 times the minimum field conversion length in the conventional low-density/high-density compatible magnetic disc apparatus, but the gap length $g_0$ of the present invention is set to be wider than the gap length g.

A magnetic disc 8 for low-density write/read is comprised of a magnetic layer 9 and a disc base 10 and when the write/read head 5 with the gap length $g_0$ performs write with respect to such a magnetic disc 8, it is possible to magnetize to a deep portion of the magnetic layer 9 indicated by $d_0$. It is therefore possible to obtain a favorable overwrite characteristic and read margin for the low-density mode. This is to say that the first feature of the present invention functions effectively in the low-density mode and that the write/read characteristics for this mode are improved.

A second features of the present invention is the provision of a cosine equalizer in a read circuit of the magnetic disc apparatus. FIG. 4 shows the basic construction of a cosine equalizer 11 which comprises a differential amplifier 12, a variable resistor 13 for gain adjustment, a delay line 14 with a delay time $\tau$, and a matching resistor 14. FIG. 5 shows the waveforms obtained at positions A through D in FIG. 4 when a signal having the waveform indicated by (A) in FIG. 5 arrives at an input terminal. By the appropriate selection of the delay time $\tau$, it is possible for the cosine equalizer 11 to reduce the amount of peak shift included in the arriving read signal. This is to say that the cosine equalizer 11 can be used as a circuit to compensate for the characteristics resulting from the peak shift. Details of the use of a cosine equalizer to reduce the peak shift may be found in "Read Waveform Correction in Magnetic Recording", Technical Report NK-6759 of Nippon Tsushin Gijutsu Kabushiki Kaisha published October 1984.

The following will consider a magnetic disc apparatus having a high-density magnetic disc for write/read and its write/read characteristics in the high-density mode. The resolution will lower and increased interference between the waveforms of adjacent bits may generate the peak shift if the aforementioned gap length $g_0$ is made larger. However, by providing the cosine equalizer 11 in the read circuit makes it possible to prevent the peak shift and the lowering of the resolution that are problems in the high-density mode. This is to say that the second feature of the present invention functions effectively in the high-density mode and that the write/read characteristics are improved for this mode. Accordingly, the magnetic disc apparatus of the present invention can provide favorable write/read characteristics in both the low-density and high-density modes.

It must be mentioned that the abovementioned first feature and second features are not independent of each other, but are closely related. In the low-density mode for example, if the gap length $g_0$ is made more than 1.2 times the minimum field conversion length for high-density write, then the overwrite characteristic and the read margin will improve since magnetization made deep into the magnetic layer 9. However, if this write/read head is used in the high-density mode, then this will mean that the cosine equalizer 11 will not be able to provide sufficient compensation for the peak shift and the write/read characteristics in the high-density mode will consequently deteriorate. On the other hand, if the gap length $g_0$ is made smaller so as to improve the write/read characteristics in the high-density mode, then the deterioration of the low-density characteristics will be as already described.

Because of this, according to experiments conducted by the present inventors, the gap length $g_0$ set within a range of 0.60 to 1.20 times the minimum field conversion length will provide the full benefit of the cosine equalizer 11 and allow a sufficient depth of magnetization to be obtained for the low-density mode. It is therefore possible to obtain favorable write/read characteristics for both the low-density and high-density modes.

The following Table gives a comparison of the characteristics of the present invention and the characteristics of the conventional compact magnetic disc apparatus for use with both the 2MB and 1MB magnetic discs.

TABLE

| Characteristic | Conventional device | This invention | Notes |
| --- | --- | --- | --- |
| Overwrite characteristic | −18 to −24 dB | −26 to −32 dB | The smaller the overwrite characteristic the better. |
| Resolution (for 2 MB) | approx. 72% | approx. 63% | Ratio of read output voltages with respect to input signals 1 F and 2 F for innermost track. The larger the better. |
| Time margin (for 2 MB) | 500 nS min. | 500 nS min. | The larger the better. |
| Compatible (For 1 MB) | 60% min. | 70% min. | Ratio of read output voltages for read/write with a dedicated 1 MB apparatus, and output voltages for read with a dedicated 1 MB apparatus when a disk has signal 2 F written to the innermost track in the 1 MB mode by a 2 MB/1 MB compatible apparatus. The larger the ratio the better. |
| R/W head gap width | 0.75 μm | 0.95 μm | |

Further, the present invention is not limited to these embodiments, but various variations and modifications may be made without departing from the scope of the present invention.

What is claimed is:

1. A magnetic disc apparatus comprising:
a single write/read magnetic head for carrying out write/read with respect to either one of a low-density magnetic disc and a high-density magnetic disc, said write/read magnetic head having a core gap length which is between 0.60 and 1.20 times a minimum field conversion length for high-density write by a write/read signal; and
a cosine equalizer supplied with a read signal from said write/read magnetic head.

2. The magnetic disc apparatus as claimed in claim 1 wherein the magnetic disc has a diameter of 90 mm (3.5 inches).

3. The magnetic disc apparatus as claimed in claim 1 wherein the magnetic disc is a floppy disc.

4. The magnetic disc apparatus as claimed in claim 1 wherein a delay time of said cosine equalizer is arbitrarily selectable.

5. The magnetic disc apparatus as claimed in claim 1 wherein a magnetic recording density for the high-density write/read is 2MB and a magnetic recording density for the low-density write/read is 1MB.

6. The magnetic disc apparatus as claimed in claim 5 wherein said minimum field conversion length is 1.46 μm.

7. The magnetic disc apparatus as claimed in claim 2 wherein the magnetic disc has a magnetic layer with a thickness of approximately 1.0 to 2.0 μm.

* * * * *